(12) United States Patent
Gonzaga

(10) Patent No.: US 6,886,619 B2
(45) Date of Patent: May 3, 2005

(54) TIRE ASSEMBLING-RELEASE MACHINE

(75) Inventor: Tullio Gonzaga, Correggio (IT)

(73) Assignee: Butler Engineering & Marketing Srl, Rio Saliceto (IT)

( * ) Notice: Subject to any disclaimer, the term of this patent is extended or adjusted under 35 U.S.C. 154(b) by 21 days.

(21) Appl. No.: 10/443,076

(22) Filed: May 22, 2003

(65) Prior Publication Data

US 2003/0221791 A1 Dec. 4, 2003

(30) Foreign Application Priority Data

May 29, 2002 (IT) .................................. VR2002A0060

(51) Int. Cl.⁷ .......................................... B80C 25/128
(52) U.S. Cl. ..................................... 157/1.28; 157/1.2
(58) Field of Search ............................. 157/1.28, 1.2, 157/1.17, 1.44, 1.26, 1.1, 1.22, 1.21, 1.11

(56) References Cited

U.S. PATENT DOCUMENTS

| 4,047,553 | A |   | 9/1977 | Kotila |  |
|---|---|---|---|---|---|
| 5,226,465 | A |   | 7/1993 | Schon et al. |  |
| 6,182,736 | B1 | * | 2/2001 | Cunningham et al. | 157/1.24 |
| 6,227,277 | B1 | * | 5/2001 | Corghi | 157/1.24 |
| 6,422,285 | B1 | * | 7/2002 | Gonzaga | 157/1.24 |

FOREIGN PATENT DOCUMENTS

| DE | 478 238 C | 6/1929 |
|---|---|---|
| EP | 0 042 363 A | 12/1981 |
| EP | 1 155 880 A | 11/2001 |
| EP | 1 157 860 A | 11/2001 |

\* cited by examiner

*Primary Examiner*—Joseph J. Hail, III
*Assistant Examiner*—Alvin J. Grant
(74) *Attorney, Agent, or Firm*—Nixon & Vanderhye P.C.

(57) ABSTRACT

A tire assembling-disassembling machine includes a supporting, locking and rotating device for a wheel-rim for a vehicle tired-wheel about the axis of rotation of the wheel, at least one bead releasing assembly provided with a fixed support structure and a pair of supports extendible-retractable in a substantially radial direction with respect to the axis of rotation starting from the fixed support structure and slidingly mounted along guide structure, at least one bead releasing roller carried at one end of a respective extendible-retractable support, driving structure for moving the arms towards and away from each other, a tool for fitting a tire onto the wheel-rim, a controller for radially extending-retracting each support and controllable locking-releasing structure for each support in an extended position thereof, and additional controllable driving structure to effect an additional extension of its respective support when locked in its extended working position by the locking-releasing structure.

17 Claims, 6 Drawing Sheets

TIRE ASSEMBLING-RELEASE MACHINE

FIELD OF THE INVENTION

The present invention relates to a tire-fitting machine provided with a dynamic bead releasing assembly.

BACKGROUND OF THE INVENTION

As known to the skilled persons in the art, tire assembling/disassembling machines have already been proposed, which are provided with bead releasing assemblies comprising roller elements suitable for effecting the synchronous and dynamic bead releasing at the two sides of a tire. The bead releasing rollers are each supported by a respective telescopic arm and undergo combined radial lowering and lifting displacements towards the centre of the wheel-rim, while exerting a pressure onto the beads of the tire, close to, and inside the respective edge of the wheel-rim.

In recent years, however, there have been provided tires having specific gripping systems, whereby the tire is caused to grip onto the wheel-rim and such combined movement of the bead releasing roller elements is useless and, at times, even counterproductive.

SUMMARY OF THE INVENTION

A main object of the present invention is to provide a tire assembling-disassembling machine suitable for effecting a dynamic bead-releasing operation on tires that better fulfils recently arisen needs, i.e. that makes it possible to control or prevent, at the operator's discretion, radial displacement of the bead-releasing roller elements during a bead-releasing operation.

Another object of the present invention is to provide a novel tire assembling-disassembling machine that can be produced at competitive production and operation costs as compared with conventional machines.

These and other objects that will be better apparent below, are attained by a tire assembling-disassembling machine provided with a supporting, locking and rotating device for a wheel-rim of a vehicle wheel about the axis of rotation of the wheel, at least one bead releasing assembly provided with a fixed support structure, and a pair of supports extendible-retractable in a substantially radial direction with respect to said axis of rotation starting from said fixed support structure, and slidingly mounted in guide means, whereby being movable towards and away from each other, at least one bead-releasing roller element carried at one end of a respective extendible-retractable support away from said fixed support structure, driving means for moving said pair of arms towards and apart from each other, a tool for fitting a tire onto said wheel-rim, control means for radially extending-retracting each extendible-retractable support, and controllable locking-releasing means for each support in its extended position, and is characterised in that it comprises additional controllable actuation means to effect an additional extension of its respective support, when the same is locked in its extended working position by said locking-releasing means.

Advantageously, each extendible and retractable support means comprises a telescopic assembly having an inner telescopic component, an intermediate telescopic component, and an outer telescopic component, said inner telescopic component overhangingly extending from said intermediate telescopic component, towards said supporting, locking and rotating device, said intermediate telescopic component supporting said controllable locking/releasing means, and said outer telescopic component being supported by said fixed support structure and controlled by said additional driving means.

BRIEF DESCRIPTION OF THE DRAWINGS

Further aspects and advantages of the present invention will be better apparent from the following detailed description of one preferred embodiment thereof, given by way of illustrative not limiting example, with reference to the accompanying drawings, in which.

In the Figures of the accompanying drawings, the same or similar parts or components are designated with the same reference numerals.

DETAILED DESCRIPTION OF THE PREFERRED EMBODIMENT

Figure 1:
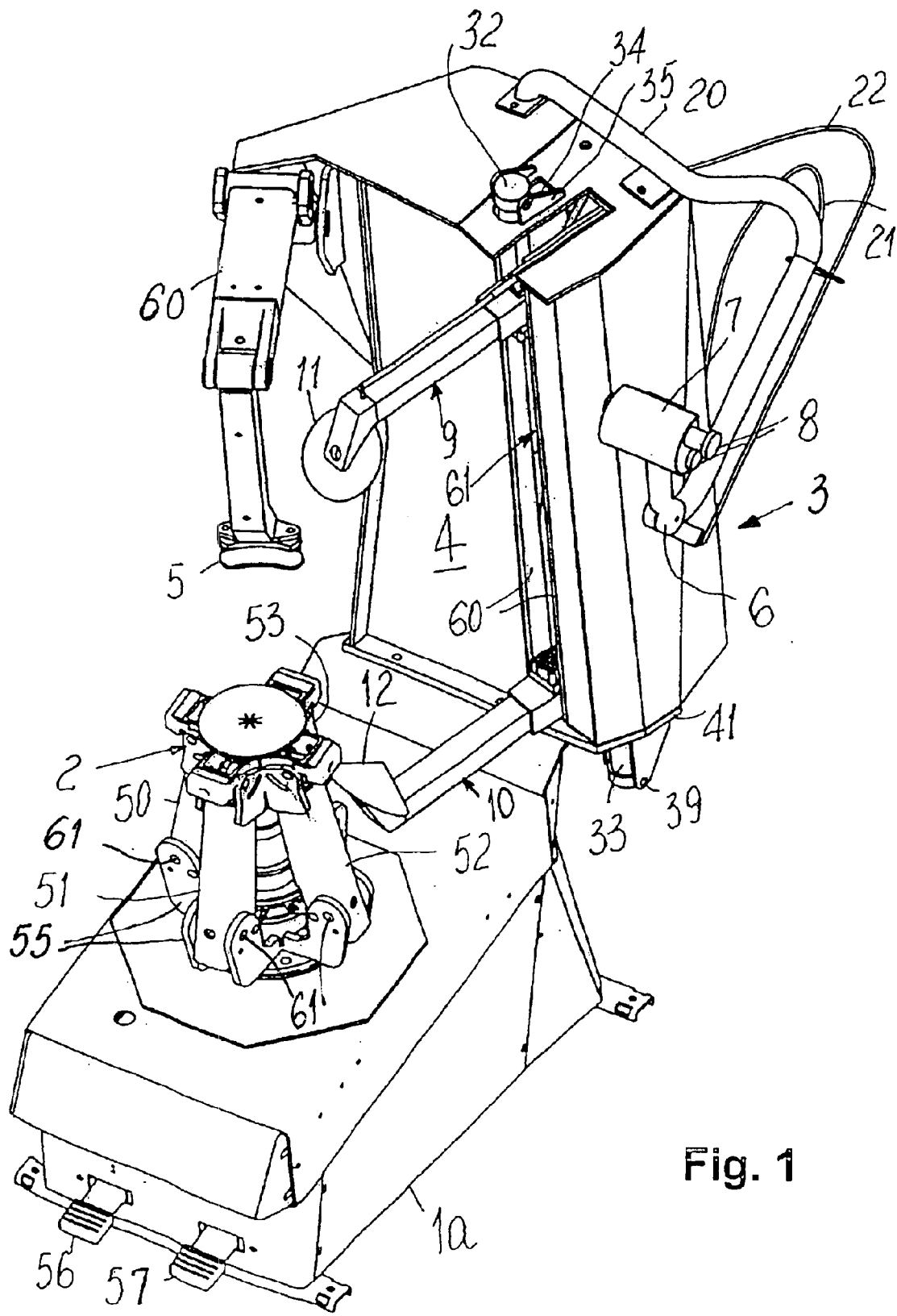
FIG. 1 is a perspective view, slightly from top, of a tire assembling/disassembling machine according to the present invention.
Figure 2:
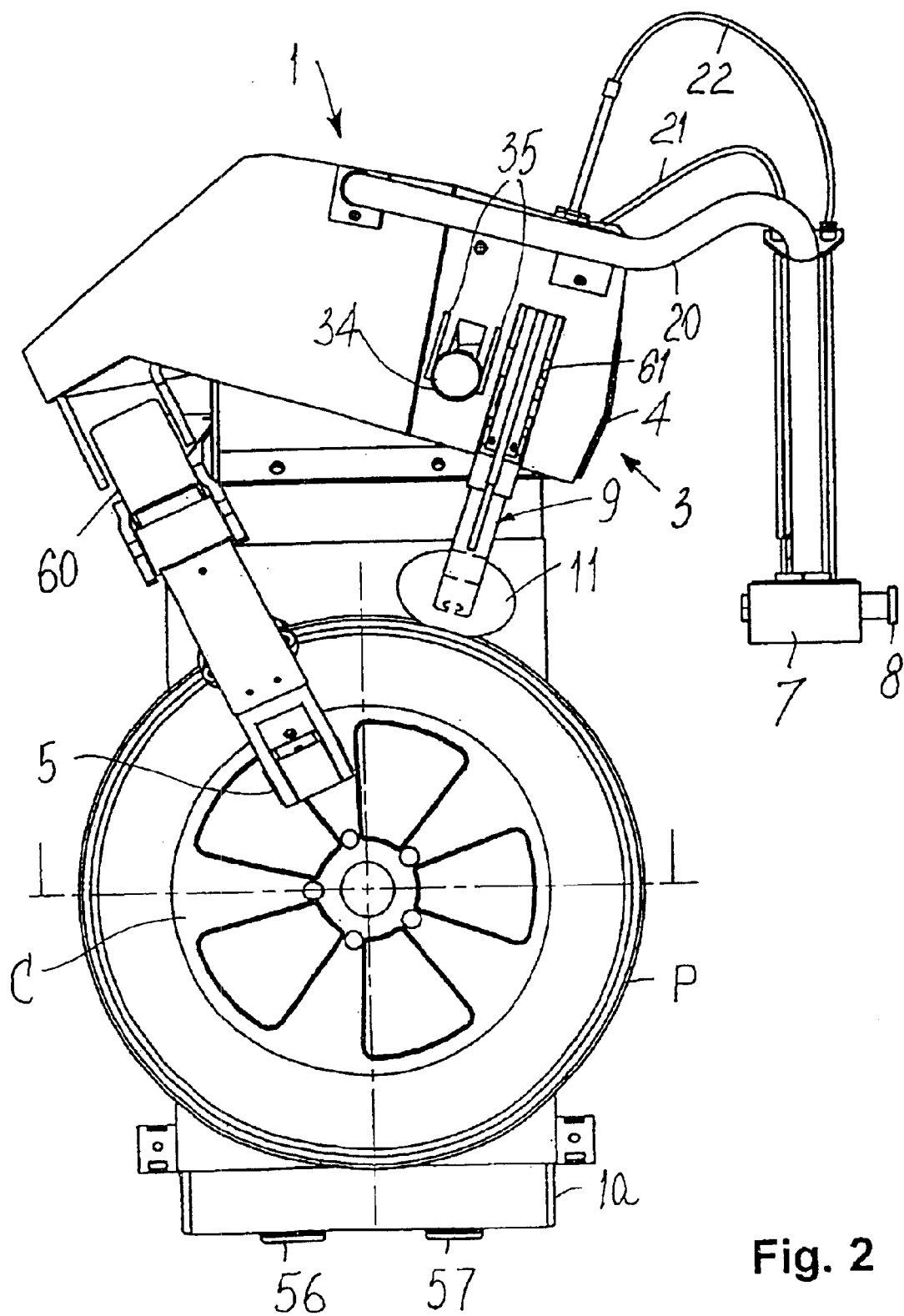
FIG. 2 shows a top plan view of the machine shown in FIG. 1.

With reference first to FIGS. 1 to 6, it will be noted that an assembling-disassembling machine according to the present invention, generally designated at 1, comprises a base frame 1a, a self-centring device 2 for supporting, locking and rotating a wheel-rim C of a vehicle-wheel about the axis of rotation of the wheel itself, a bead releasing assembly 3 supported by a rigid structure or upright 4, preferably rising from the back of the base frame 1a, and a fitting or assembling tool 5 carried by upright 4. A manoeuvring lever 6 provided with a knob 7 and buttons is, in turn, engaged with upright 4.

Bead releasing assembly 3 has a pair of supports: an upper support 9 and a lower support 10, which are extendible and retractable in a substantially radial direction with respect to the axis of rotation of the self-centring assembly 2, starting from the upright 4, and carry at the head thereof, i.e. at their end away from upright 4, a respective bead-releasing assembly 11, 12.

More particularly, upper support 9 and lower support 10 each comprises a telescopic assembly having an inner telescopic component 13, an intermediate component 14 in or on which the self-centring assembly 13 can slide, and an outer component 15, in or on which the intermediate telescopic component 14 is slidably mounted.

Preferably, each telescopic component 13, 14 and 15 comprises a tubular element polygonal in cross-section, e.g. having a square cross-section, thus preventing angular displacements of one component with respect to the other.

Figure 6:
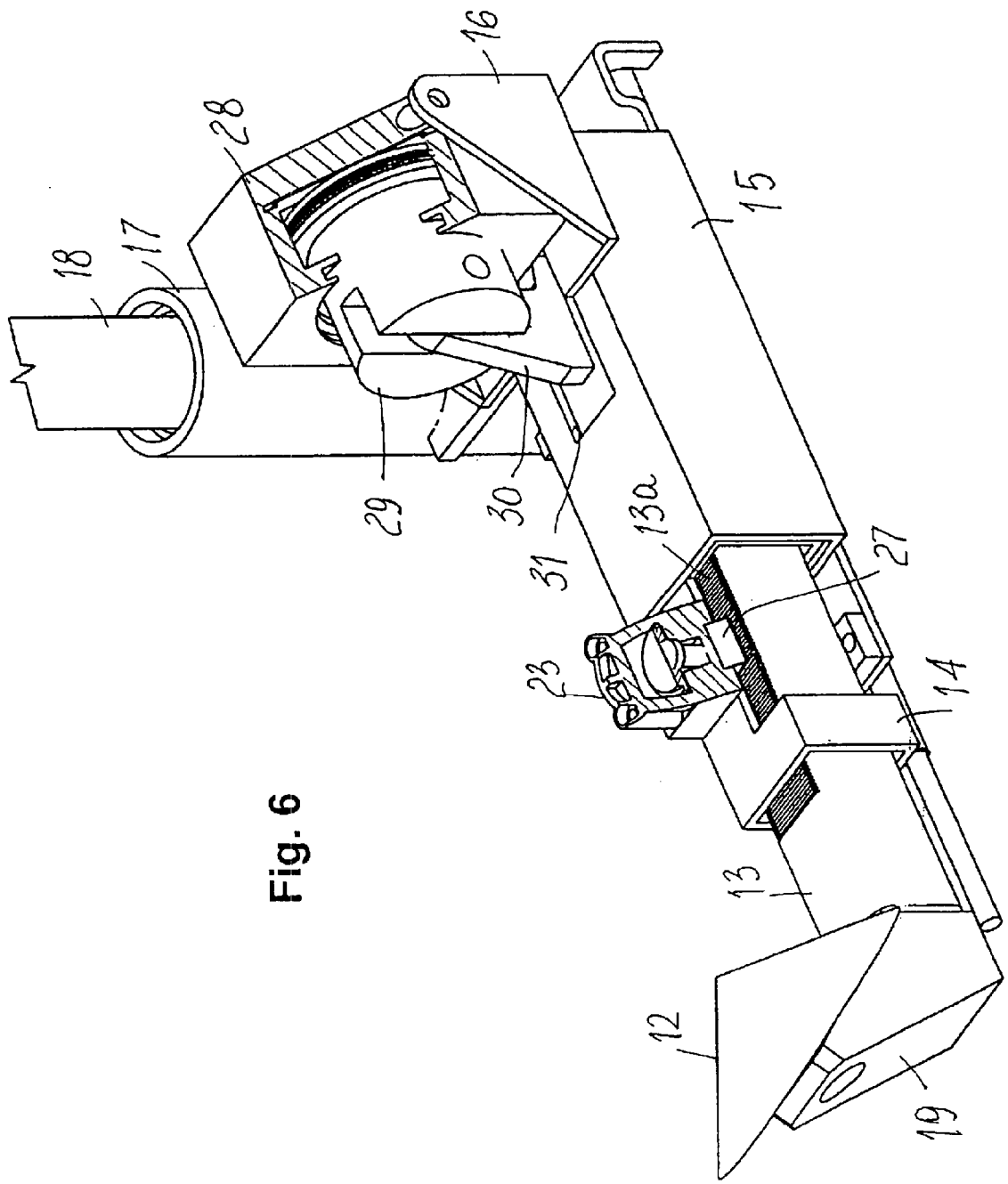
FIG. 6 shows a perspective view on an enlarged scale of the lower telescopic arm of the machine shown in FIG. 1.

The outer telescopic component 15 is, in turn, supported by a support bracket 16, which is overhangingly carried by a sleeve, a slide or a carriage 17, slidingly mounted along a guide upright or tubular member 18 extending parallel to the axis of rotation of the self-centring assembly 2 (see in particular FIG. 6).

Inner telescopic component 13, at its end away from component 14, carries an angled arm 19, on which a bead releasing roller element 11, 12 is mounted for rotation about an axis of rotation having a desired inclination, e.g. 45°, with respect to the axis of rotation of the self-centring assembly 2. Extension and retraction of the telescopic component 13 can be controlled by means of lever 6, carried by an overhangingly swivelling arm 20, in turn, carried by upright 4 and designed to drive a pair of flexible transmission cables 21 and 22, whereby both inner telescopic components 13 are extended and retracted to the same extent and in a synchronous manner.

Figure 4:
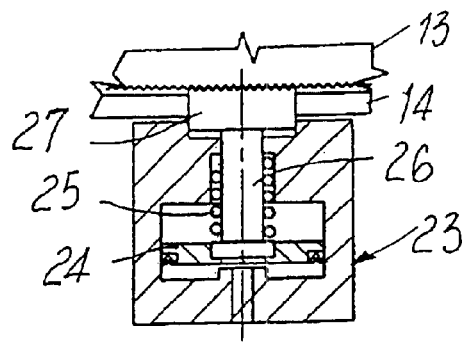
FIG. 4 shows a detail on an enlarged scale of a locking/release means illustrated in FIG. 3.

The telescopic components 13 can be locked in the extended position reached upon control by lever 6 by means of an air operated actuator 23, better illustrated in FIG. 4 and fixed onto the intermediate telescopic component 14 in any suitable way. Linear actuator 23 comprises e.g. an air operated jack, the piston 24 of which is yieldingly biased by a return spring 25 and controls a stem 26 that at the end thereof extending out of the jack has a block 27, which preferably has its face facing towards its respective inner toothed telescopic component 13 thereby securely engaging with a respective longitudinal teeth 13a formed in the telescopic component 13.

The intermediate component 14 of each telescopic assembly 9 and 10, on the other hand, can be controlled to effect movements throughout extension-retraction paths by means of a, preferably double-acting, linear actuator 28, whose stem 29 actuates arm 30, which is designed to cause the intermediate component, and thus the inner component 14, to extend out, and retract towards the outer component 15 through a longitudinal opening or slot 31 formed in the outer telescopic component 15.

Figure 3:
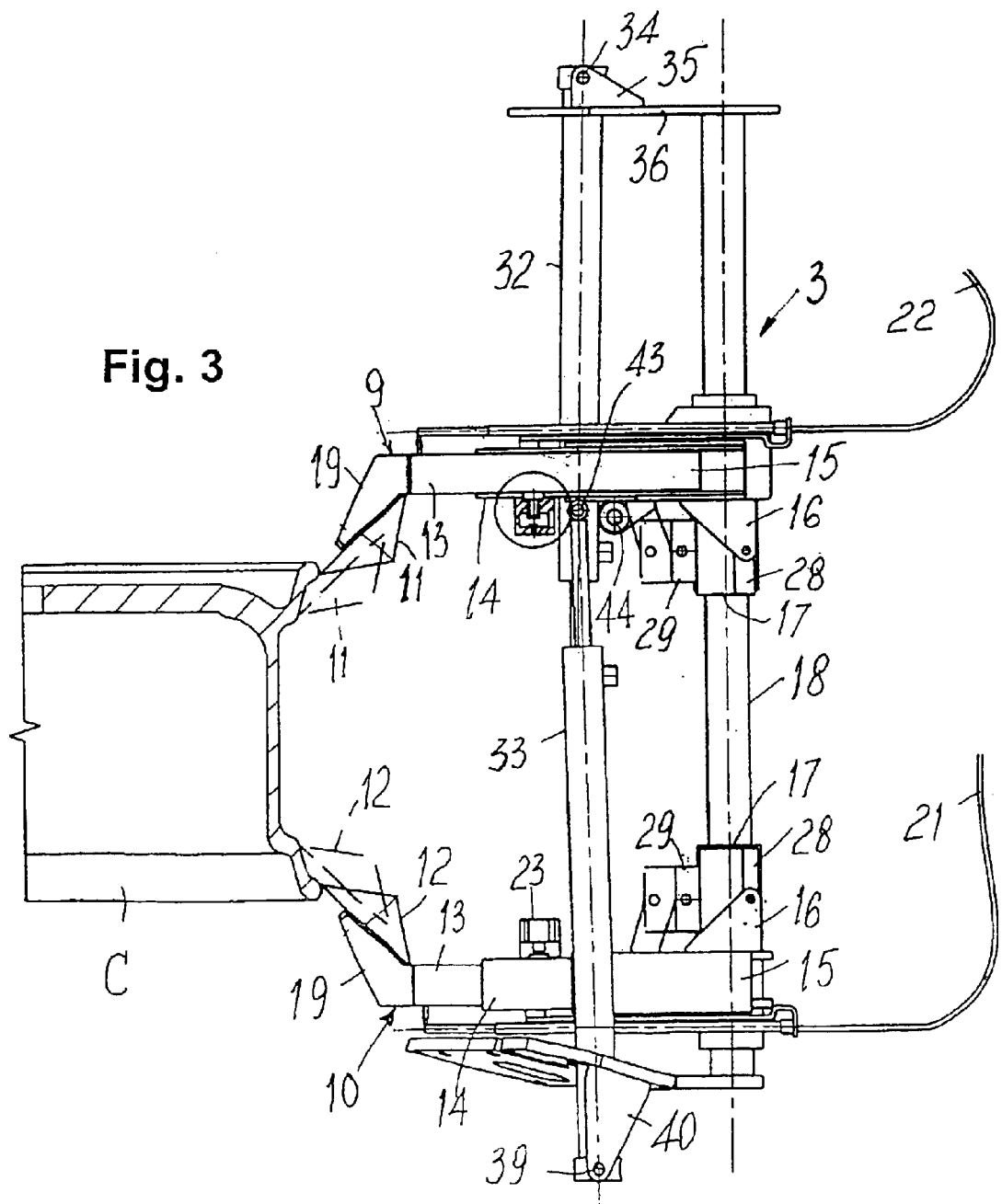
FIG. 3 shows a diagrammatic side elevation view of a rigid structure supporting a pair of bead-releasing arms and a wheel-rim.
Figure 5:
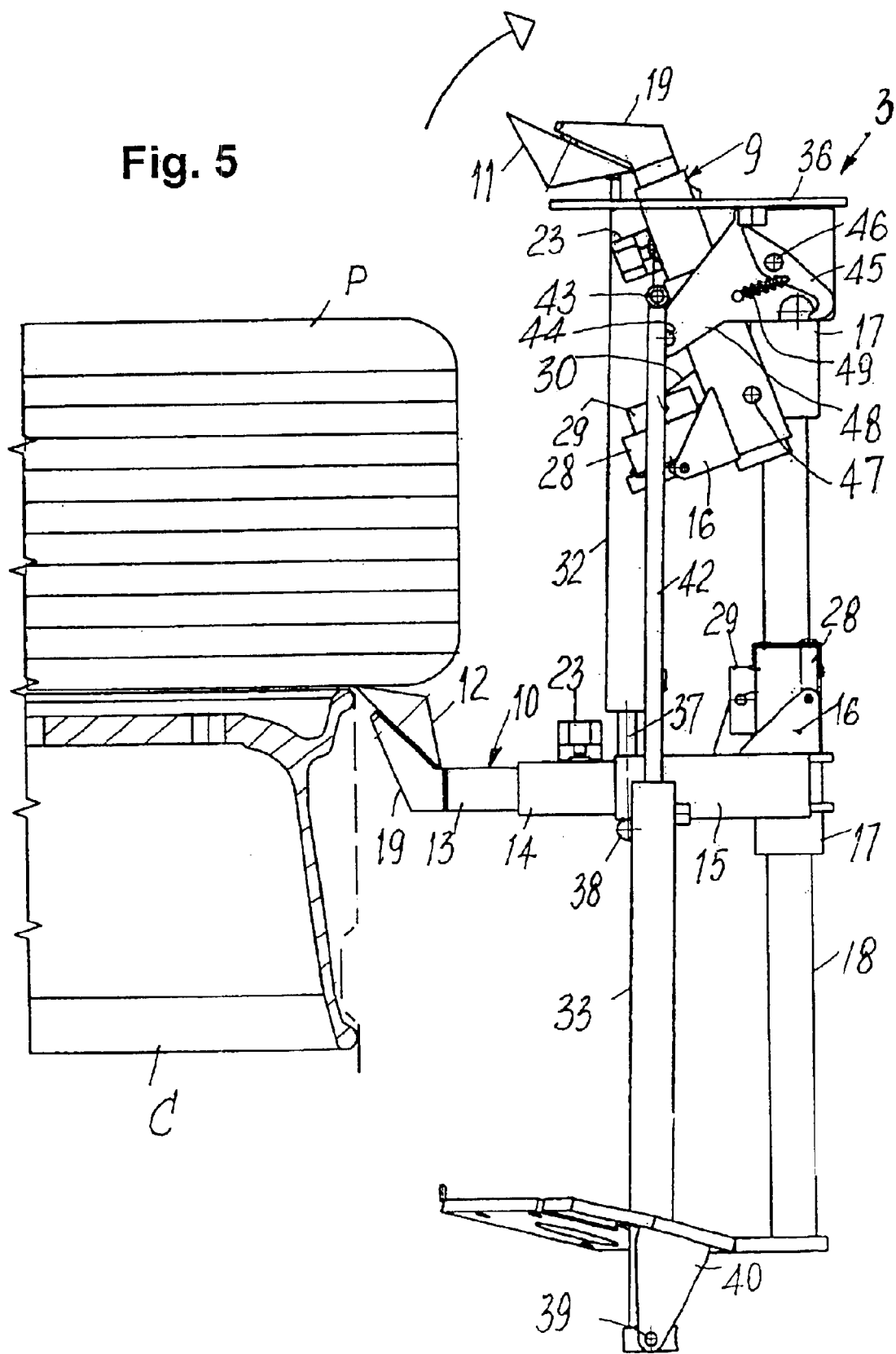
FIG. 5 is a view similar to that of FIG. 3, but in a different operating arrangement.

The two outer telescopic components 15 of the two telescopic assemblies 9 and 10, respectively, slidingly mounted on the guide upright 18, are each controlled by a respective linear actuator 32, 33, e.g. a double-acting air or oil operated jack (FIGS. 3 and 5). Jack 32 has its cylinder pivotally mounted to a pin 34 with a transverse axis supported by a pair of lugs 35, in turn, supported by an upper cross-member 36 carried at the top of upright 18, and its stem 37 articulated to a transverse pin 38 carried by the outer telescopic component 15, so that an extension movement of the jack 32 results in the telescopic assembly 10 being lowered with respect to the self-centring assembly 2, whereas a retraction movement of the jack causes a corresponding lifting movement of the assembly.

Jack 33 has its cylinder articulated to a transverse pin 39, e.g. carried by a pair of lugs 40 fixed to a lower support plate element on which upright 18 rests, whereas its stem 42 is articulated to a transverse pin 43 carried by the outer component 15 of the telescopic assembly 9. Jacks 32 and 33 are in communication with a pressurised air or oil source (not shown in the drawings) and are synchronously or separately controllable by push-buttons 8, which control a respective electro-valve, not shown and of any suitable type, designed to feed its respective jack.

Preferably, bracket 16 of upper telescopic assembly 9 is not fixed to sleeve 17 (FIG. 5), but only to the outer telescopic component 15, which is pivoted to a transverse pin 44 parallel to pin 43 and supported by sleeve 17. The upper telescopic assembly 9 can be locked in position by a crick-lever 45 pivoted at 46 to sleeve 17 and arranged to be engaged by a pawl 47 carried by the outer telescopic component 15 of telescopic assembly 9. If desired, the crick-lever 45 is resiliently loaded by a spring 49 anchored to a gusset plate 48 supported by a sleeve 17, whereby, when the lever 45 abuts against the top of cross-member 36, it is urged to rotate about pin 46, thereby being released from pawl 47. The telescopic assembly 9 is thus allowed to rotate about pin 44 upon being urged by jack 33 which is being extended, and is caused to overturn, thereby being angularly displaced apart from the working area (FIG. 5).

The self-centring assembly 2 has 4 arms 50, 51, 52 and 53 equal to, and uniformly angularly spaced apart from each other, and is provided with a suitable motor to cause a wheel-rim C of a vehicle-wheel to rotate while a tire P is being assembled or disassembled, as well as a suitable actuator, preferably fluid dynamic actuator, for axially displacing (along the axis of rotation of the assembly) a collar 54 in which a radial extension 50a, 51a, 52a and 53a with a rounded head, of each arm 50–53, respectively, is slidingly engaged as it is well known in the state of the art.

Arms 50–53 are articulated at their lower end, i.e. in proximity of a respective radial appendix 60 to a respective pivot pin 61 to a carousel plate 55 coaxially supported by, and spaced apart from, collar 54, whereas their upper ends each supports a respective fixed jaw 62, preferably made of a rubber stopper designed to engage the inner wall of a wheel-rim C to be engaged and locked to the self-centring assembly 2.

Figure 7:
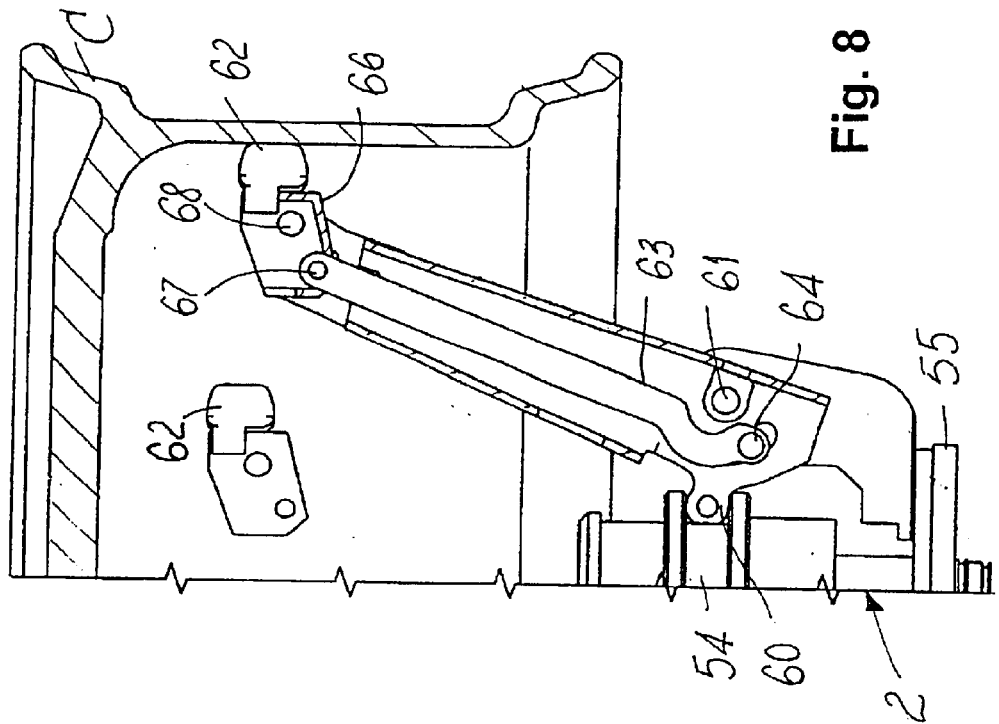
FIG. 7 shows a half elevation side view with parts in cross-section, of a conventional self-centring assembly.
Figure 8:
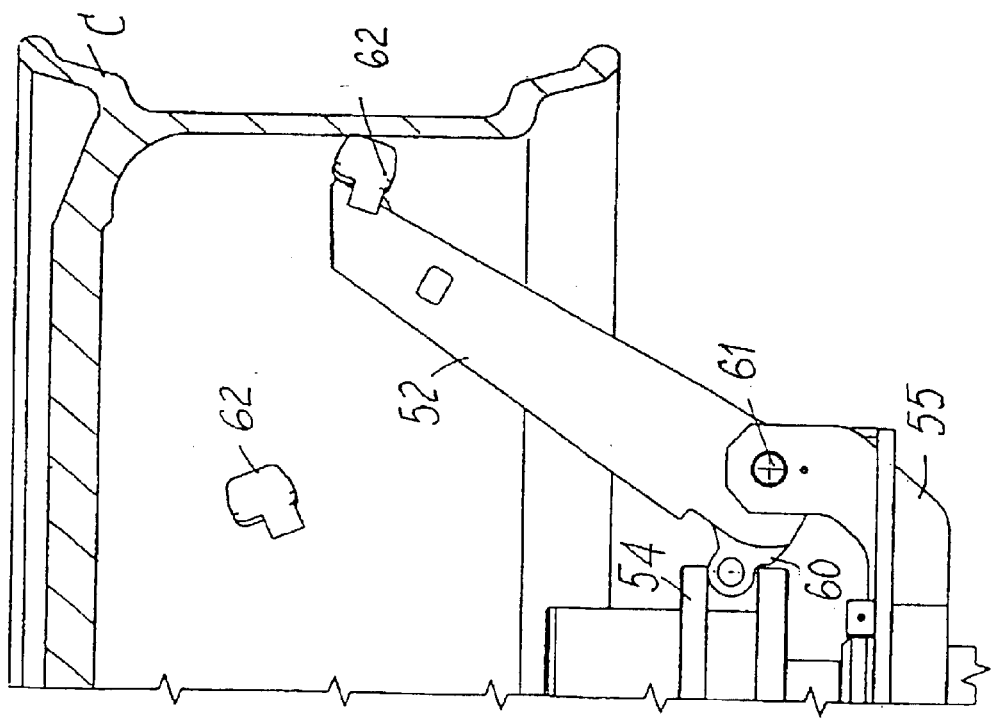
FIG. 8 shows a partial cross-section view taken along line VIII—VIII in FIG. 2, which is similar to that of FIG. 7, but illustrating a self-centring assembly according to the present invention.

As shown in FIG. 7, jaws 62 when in a mutually spread apart or working position are more or less tilted with respect to the inner wall of tire C, depending on the inner diameter of the wheel-rim, whereby a worse than optimal, or even defective, engagement may result, since the contact surface of the jaw with the inner surface of the wheel-rim C becomes increasingly smaller as the inner diameter of the wheel-rim increases, and thus the total local load is sometimes increased to such an extent that the wheel-rim is deformed.

According to the present invention, each arm 50–53 is tubular in shape and a respective rod 63 is provided therein, that has its lower portion articulated to plate 55 at a position close to the articulation pin 61 of its respective arm through a respective slot 64, and its upper portion pivoted to a respective pin 65 extending parallel to a respective lower pin 61 and supported at the top of a respective arm 50–53. A jaw 66 provided with a respective rubber buffer 62 is also articulated to a respective pin 67. Each jaw is articulated to the top of its respective arm at another pin 68, so that each arm 50–53, whose lower portion is articulated to a respective pair of pins 61 and 64, its respective rod 63 and its respective jaw form an articulated parallelogram system, whereby by varying the angle through which arms 50–53 are spread apart (depending upon the inner diameter of wheel-rim C) its respective jaw, and thus the stopper carried by it, abuts against the inner surface of wheel-rim C while keeping away the same attitude and thus with largest possible abutment surface. The same also applies to jaws 66 designed to lock wheel-rim C from outside.

Arms 50–53 can be driven by an oil-operated cylinder, as well as by a reversible motor assembly that controls a screw, or a gear-wheel unit as known in the state of the art, or any other suitable system. The rotation movement of the self-centring assembly 2 can be attained by means of a slowly rotating air-operated motor, an electric motor provided with a speed-reduction unit, or an oil-operated motor. Arms 50–53 are controlled and caused to rotate by pedals 56, 57 provided in base 1a.

The fitting tool 5 can be of any suitable type, preferably lined with a plastic material to prevent wheel-rims C made of light alloys from suffering damage, and is supported by an overhanging arm 60 articulated to upright 4.

The operation of the tire assembling-disassembling machine described above is rather simple and straightforward.

In order to carry out a disassembling operation of a tire P from a wheel-rim C, the wheel-rim C is secured to the self-centring assembly 2, the actuators 23 are unlocked, then by acting on lever 6 that acts on the inner telescopic components 13 of the two telescopic assemblies 9 and 10 through wires 21 and 22, the working diameter is set. Thereafter, actuators 23 lock bead releasing roller elements 11 and 12 in their working position. After positioning bead release rollers 11 and 12 close to a respective bead on opposite sides of tire P, upon control by the operator acting on push-buttons 8 and provided on handle 7, telescopic assemblies 9 and 10 are urged to move together along the guide upright 18 and, simultaneously, the tired wheel-rim together with the tire are set into rotation thereby causing the bead to be released.

If required, during a bead releasing operation, the operator can act on a further push-button to simultaneously actuate additional actuators 29 to give each bead releasing roller 11 and 12 also an additional controlled forward motion towards the wheel-rim thereby causing the rollers to be partly wedged between the bead and the peripheral edge of the wheel-rim to attain a more effective bead-releasing action (FIG. 3). Upon releasing the push-button, actuators 29 cause the telescopic assemblies 9 and 10 to retract by a distance equal to their additional extension, whereby each bead-releasing roller can continue its movement to its set working position. Lifting both telescopic assemblies 9 and 10 can then continue and lower roller 12 (FIG. 5) can urge the tire bead out of wheel-rim C.

Meanwhile, once upper telescopic assembly 9 has reached the top of guide 18 and is automatically overturned by pivoting about pin 44 under the action exerted by cylinder 33, thereby clearing the area overlying self-centring assembly 2 to make possible a smooth removal of tire P from the wheel-rim.

A fitting operation of tire P onto a wheel-rim C is carried out in a similar manner by partly operating in reverse order.

The tire assembling-disassembling machine set forth above is susceptible to numerous modifications and variations within the scope of the present invention as defined by the Claims.

Thus, for example, lower and upper telescopic assemblies 10 and 9, respectively, are guided to maintain a radial attitude with respect to the axis of rotation of self-centring assembly 2 while moving upwards and downwards from the juxtaposed sides 60 of a longitudinal slot 61 formed in the upright or rigid structure 4 (FIG. 1). The same function can be fulfilled by providing guide upright 18 with a polygonal cross-section and telescopic elements 17 with a shape suitable for coupling in the shape with the upright, or else by providing a pair of guide uprights, or in any other equivalent manner.

What is claimed is:

1. A tire assembling-disassembling machine comprising:
    a supporting, locking and rotating device for a wheel-rim for a vehicle tired-wheel about the axis of rotation of the wheel,
    at least one bead releasing assembly provided with a fixed support structure and a pair of supports extendible-retractable in a substantially radial direction with respect to said axis of rotation starting from said fixed support structure and slidingly mounted along guide means thereby being movable towards and away from each other,
    at least one bead releasing roller carried at one end of a respective extendible-retractable support away from said rigid support structure,
    driving means for moving said pair of arms towards and away from each other,
    a tool for fitting a tire onto a wheel-rim,
    control means for radially extending-retracting each extendible-retractable support and controllable locking-releasing means for each support in an extended position thereof, and
    additional controllable driving means to effect an additional extension of its respective support when this is locked in its extended working position by said locking-releasing means.

2. A machine as claimed in claim 1, wherein each extendible and retractable support comprises a telescopic assembly having an inner telescopic component, an intermediate component, and an outer component, said inner telescopic component overhangingly extending from said intermediate telescopic component towards said supporting, locking and rotating device, said intermediate telescopic component supporting said controllable locking-releasing means and being controllable by said additional driving means, whereas said outer telescopic component is supported by said fixed support structure.

3. A machine as claimed in claim 2, wherein said additional driving means comprises a linear actuator that is fixed with respect to said outer telescopic component and designed, upon control, to cause said intermediate telescopic component to extend from, and retract towards, said outer telescopic component.

4. A machine as claimed in claim 3, wherein said linear actuator comprises a double-acting jack provided with a stem having a control arm extending through an opening formed in said outer telescopic component to engage and control said intermediate telescopic component.

5. A machine as claimed in claim 2, wherein said controllable locking-release means of each support comprises a linear actuator carried by said intermediate telescopic component and an engagement element designed to engage said inner telescopic component under the action exerted by said linear actuator.

6. A machine as claimed in claim 5, wherein said linear actuator comprises a fluid operated jack, and a resilient loading spring for said jack.

7. A machine as claimed in claim 5, wherein said engagement member is a block having teeth for engagement with one side of said inner telescopic component.

8. A machine as claimed in claim 5, wherein said inner telescopic component has a rough or toothed surface for engaging with said engagement member.

9. A machine as claimed in claim 1, wherein said axis of rotation is substantially vertical and said extendible and retractable supports are arranged one above the other, and wherein it comprises a rectilinear guide element carried by said fixed structure and extending substantially parallel to said axis of rotation, with which said upper and lower extendible and retractable supports are slidingly engaged by means of a respective slide or carriage element.

10. A machine as claimed in claim 9, wherein said upper extensible and retractable support is articulated to said slide or carriage member, so that, when said slide or carriage member is displaced to the top of said guide member, it is overturned upwards by a respective actuation means.

11. A machine as claimed in claim 10, comprising a locking device for locking an upper telescopic assembly in a lifted position.

12. A machine as claimed in claim 11, wherein said locking device comprises a crick-lever pivoted on said respective slide or carnage member, a gusset plate fixed to said slide or carriage member, a pawl member carried by said outer telescopic component, and a resilient loading spring having one end thereof anchored to said lever and its other end anchored to said gusset plate.

13. A tire assembling-disassembling machine comprising:
- a supporting device for locking and rotating a wheel-rim for a vehicle tired-wheel about the axis of rotation of said wheel,
- at least one bead releasing assembly,
- a tool for fitting a tire onto said wheel-rim,
- control means for said supporting, locking and rotating device, wherein said device for supporting, locking and rotating said wheel-rim comprises a self-centring assembly having a plurality of arms equal to and uniformly angularly spaced apart from each other and each provided with a respective radial extension and a respective rubber stopper at one end thereof, a plate member arranged axially sliding along said axis of rotation and articulated to the other end of each of said arms, a collar shaped element coaxial and integral with said plate member and slidingly engaging with said radial extensions, a motor designed to cause said wheel-rim to rotate about said axis of rotation, an actuator means designed to displace said plate element and said collar element along said axis of rotation, each of said arms comprising a respective rod, whose opposite ends are articulated one to an end of its respective arm and the other to said plate element, a buffer-carrying jaw for each arm articulated both at the head of each said arm and at said rod, whereby an articulated parallelogram system is formed at each said arm in such a way that, although the opening angle between said arms is changed with respect to said axis of rotation, said stopper-carrying jaws engage said surface of said wheel-rim in the same attitude.

14. A machine as claimed in claim 13, wherein said arms have a tubular structure and a respective rod is located therein.

15. A tire assembling-disassembling machine as claimed in claim 13, wherein said bead-releasing assembly comprises a fixed support structure and a pair of supports extendible-retractable in a substantially radial direction with respect to said axis of rotation starting from said fixed support structure and slidingly mounted along guide means thereby being movable towards and away from each other.

16. A machine as claimed in claim 1, wherein said guide means comprises a common guide member on which the pair of supports are slidingly mounted.

17. A tire assembling-disassembling machine comprising:
- a supporting, locking and rotating device for a wheel-rim for a vehicle tired-wheel about the axis of rotation of the wheel,
- at least one bead releasing assembly provided with a fixed support structure and a pair of supports extendible-retractable in a substantially radial direction with respect to said axis of rotation starting from said fixed support structure and slidingly mounted along a guide thereby being movable towards and away from each other,
- at least one bead releasing roller carried at one end of a respective extendible-retractable support away from said rigid support structure,
- a drive to move said pair of arms towards and away from each other,
- a tool for fitting a tire onto a wheel-rim,
- a controller for radially extending-retracting each extendible-retractable support and a controllable locking-releasing device for each support in an extended position thereof, and
- an additional controllable drive to effect an additional extension of its respective support when this is locked in its extended working position by said locking-releasing device.

* * * * *